Figure 1:
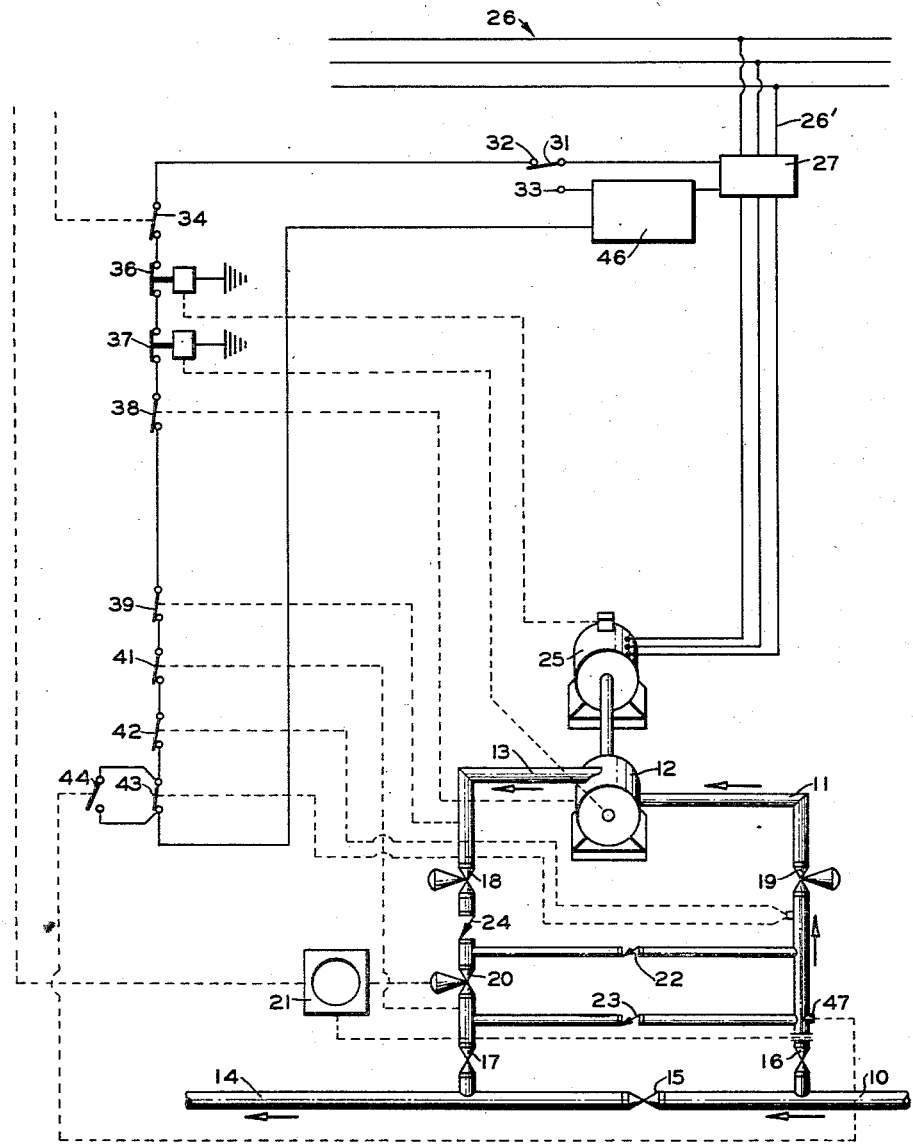

INVENTOR.
N. A. KIMMEL

BY Hudson & Young

ATTORNEYS

INVENTOR.
N. A. KIMMEL

United States Patent Office 2,950,682
Patented Aug. 30, 1960

2,950,682

METHOD AND APPARATUS FOR CONTROLLING PIPELINE PRESSURE

Norman A. Kimmel, Waco, Tex., assignor to Phillips Petroleum Company, a corporation of Delaware Filed Aug. 25, 1955, Ser. No. 530,525

19 Claims. (Cl. 103—11)

This invention relates to a method and apparatus for controlling the pressure at a pipeline pumping station. A specific aspect of the invention pertains to a method and arrangement of apparatus for operating a pipeline pump station so as to permit the pumping of low vapor pressure products at comparatively low pressure and to prevent vaporization of high vapor pressure products.

The transportation of liquid and liquefied products in the petroleum industry by long distance pipelines is becoming more widespread. Because of the pressure drop along the pipeline due to friction between the liquid and the pipe, it is necessary to utilize pump or booster stations positioned along the line at intervals of approximately 25 to 75 miles in order to boost the pressure from station to station along the line. The use of centrifugal pumps is quite general for this purpose and in the operation of such pumps it is desirable to prevent vaporization of the material being pumped. When these pumps are used in pipelines for transporting petroleum products, particularly at unattended pump stations, it has been necessary to maintain a pressure in the pump suction high enough to prevent vaporization of the most volatile products. This necessitates pumping the less volatile products at an unnecessarily high pressure, thus reducing the efficiency of the operation. I have found that by changing the controlled pressure in the pipeline when the specific gravity of the product changes, it is possible to prevent vaporization of the more volatile products, at the same time permitting the less volatile products to be pumped at lower pressures. Some embodiments of the invention are applicable to remote-controlled pump stations while others are applicable either to remote-controlled or to automatic stations.

The principal object of the invention is to provide a method and apparatus for regulating or controlling the pressure in a pipeline. Another object is to provide a method and apparatus for regulating the suction pressure at a pump station in a pipeline to permit pumping less volatile or low vapor pressure liquids at a lower pressure and more volatile or high vapor pressure liquids at a higher pressure which avoids vaporization of the liquid in each instance. A further object is to provide a method and apparatus for controlling the suction pressure at a pump station in a pipeline in accordance with the specific gravity of the liquid in the line. It is also an object of the invention to provide a method and process for automatically varying the suction pressure at a pump station in a pipeline in response to the specific gravity of the liquid in the line. Other objects of the invention will become apparent upon consideration of the accompanying disclosure.

A broad aspect of the invention comprises varying the suction pressure at a pump station in a pipeline in accordance with the specific gravity of the product being pumped so that less volatile liquids may be pumped at lower suction pressures and higher flow rates than the more volatile liquid products. In one embodiment of the invention the rate of flow of liquid through the pump is controlled by a pressure controller sensitive to the suction pressure in the line just upstream of the pump and operatively connected with a choke valve in the line on the discharge side of the pump. The controller has two set points which are remotely controlled whereby the pressure in the suction side of the line is maintained at either the high or the low value corresponding to the set points of the controller in accordance with the high or low volatility of the liquid being pumped through the line.

In one embodiment the pressure controller is utilized to control the rate of operation of the pump by regulating the torque applied by the prime mover which operates the pump or by regulation of a fluid drive connecting the prime mover with the pump. In another embodiment of the invention the pressure controller is automatically set to either the high or low pressure setting of the instrument by means of an arrangement of specific gravity switches, one connected in the line at the pump station on the discharge side of the pump, the other being connected in the line upstream of the pump station at a remote point where the suction pressure is always sufficient to maintain in complete liquid phase any liquid being pumped. In this manner when a change in liquids in the line occurs the new liquid arriving at the upstream specific gravity switch actuates the switch and, in case the liquid is of low specific gravity and high volatility, immediately breaks a circuit which changes the set point of the controller so that a higher pressure is maintained on the suction side of the pump so as to avoid vaporization of the low specific gravity product approaching the pump. In the event the liquid arriving at the upstream switch is of higher specific gravity the specific gravity switch at that point closes and when the higher specific gravity liquid passes through the pump and actuates the specific gravity switch on the discharge side of the pump a circuit is completed to the controller which reverses the instrument to the low set-point pressure thereby facilitating the pumping of the higher specific gravity and lower volatility liquid.

Figure 2:
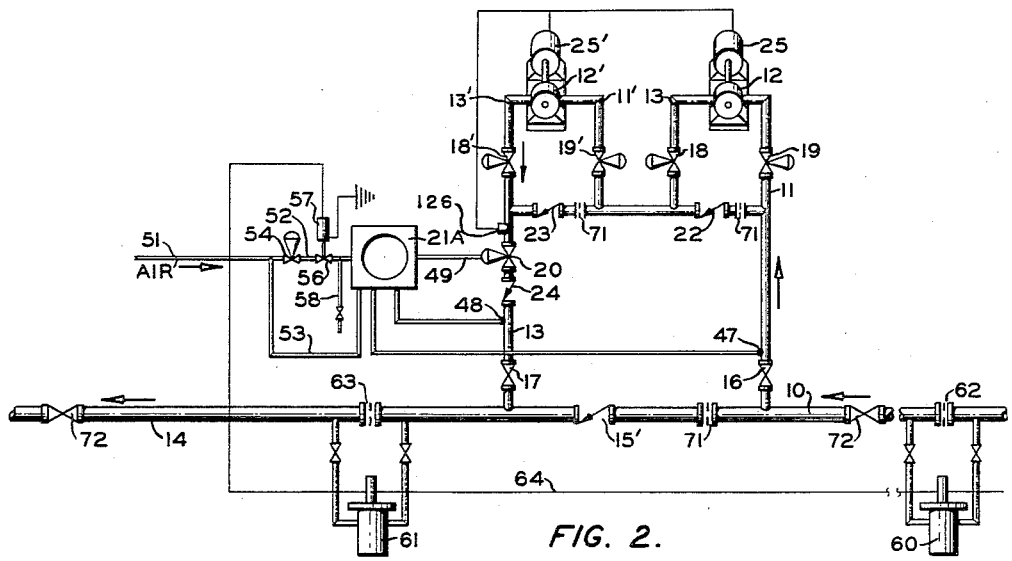
Figure 3:
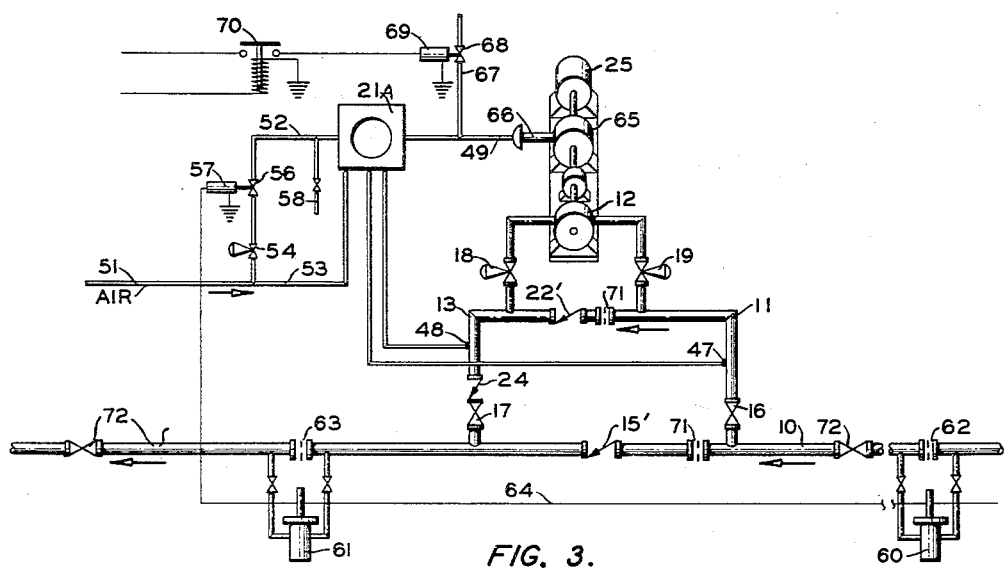
Figure 4:
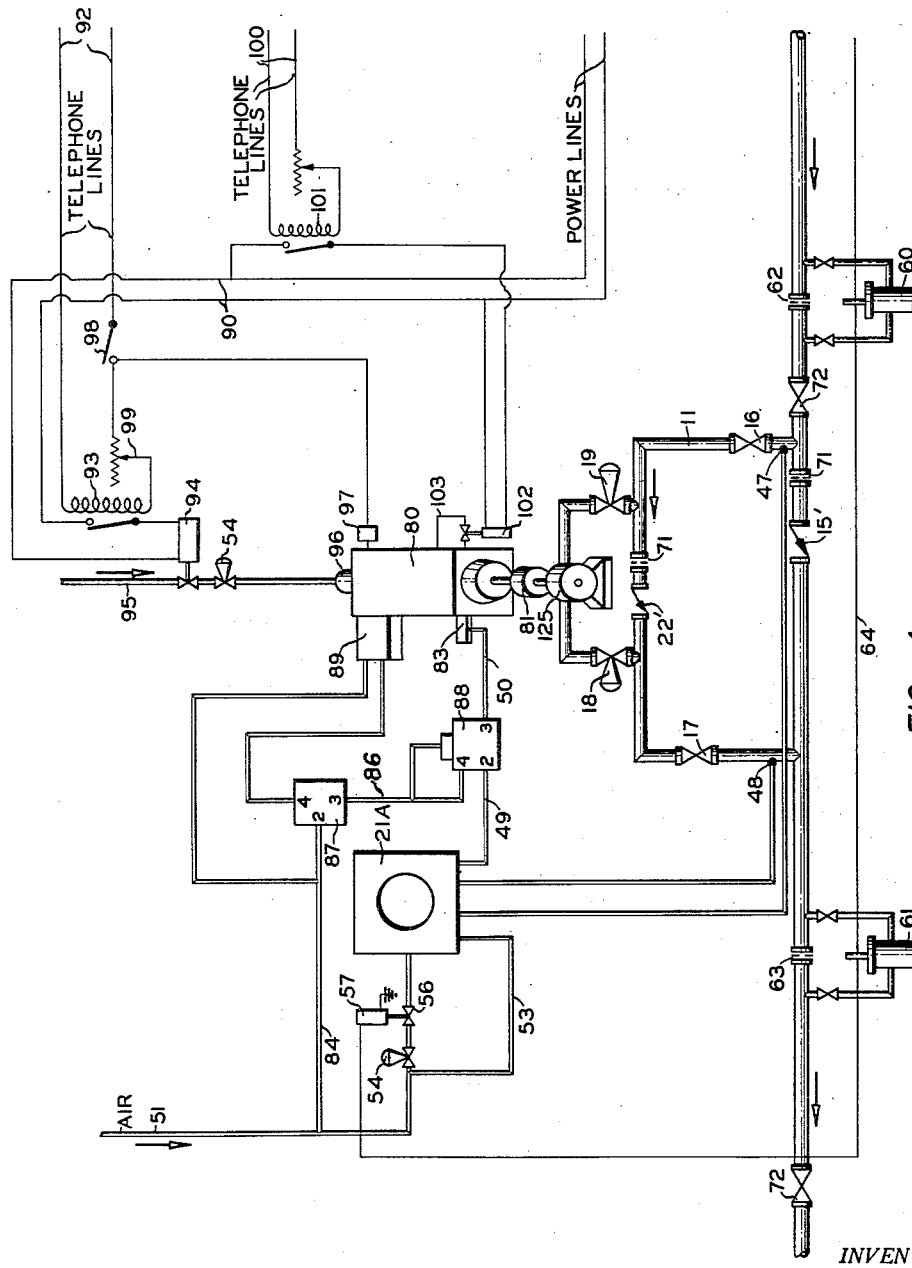

A more complete understanding of the invention may be obtained from a consideration of the accompanying schematic drawing of which Figure 1 shows an arrangement of apparatus at a pump station for remotely controlling the suction pressure in the line adjacent the pump; Figure 2 shows an arrangement of piping and instrumentation for an unattended or automatic two unit electrical-centrifugal booster station; Figure 3 shows an arrangement of piping and instrumentation for an unattended or automatic electrical-centrifugal fluid drive booster station; and Figure 4 shows an arrangement of piping and instrumentation for an unattended or automatic diesel-centrifugal booster station. Corresponding instruments and elements of the various figures are correspondingly numbered.

Referring to Figure 1, the flow of products through the station is from the upstream leg of a pipeline, represented as pipe 10, into pump suction line 11 through pump 12 and pump discharge line 13 to the downstream leg of the pipeline, represented by pipe 14. Block valves 15, 16, and 17 are provided to permit bypassing the station when desired. Motor valves 18 and 19 are provided for remote control of the starting and stopping operation and for emergency shutdown. Motor valve 20 is controlled by pressure controller 21 to maintain the pump suction pressure at its desired value. Check valves 22 and 23 permit bypassing the pump while check valve 24 prevents back flow through the pump. Pump 12 is driven by motor 25 which is supplied with power from a high voltage 3-phase system 26 by means of lines 26' in which is positioned starter box 27. The starter circuit (not shown) in box 27 comprises a switch actuated by a relay or solenoid, and a transformer which cuts down the voltage from 2300 in line 26' to 230 in the control circuit. The starter control circuit includes selector switch 31 which is set on terminal 32 for automatic operation and on terminal 33 for manual operation. With switch 31 in automatic position automatic control switches 34, 36, 37, 38, 39, 41, 42, 43, and 44 and the circuit in box 46 control the operation of the system. Switch 34 is a remotely controlled switch which is closed by a telephone or other circuit when it is desired to start the pump station. Switch 36 is relay controlled by a circuit including several thermostats and a vibration switch associated with motor 25 so that when overheating or excessive vibration of the motor occurs the pump station is shut down. Switch 37 is relay controlled by a pump-shaft-seal-failure system. Switch 38 is a temperature controlled mercury switch associated with the bearings of pump 12. This switch is illustrative of several switches which may be connected with various bearings of the pump so that excessive temperatures of any one of the bearings of the pump shuts down the pump station. Switch 39 is a pressure controlled mercury switch sensitive to the pressure between pump 12 and valve 20 and functions to break the circuit and shut the station down when an excessive pressure is built up in the discharge side of the line. Switch 41 is also a pressure controlled mercury switch actuated by high pressure downstream of control valve 20 and functions in the same manner as switch 39. Switch 42 is a pressure control switch which is open when the pressure in line 11 falls below a minimum pressure, such as 30 p.s.i.g. Switch 43 is a similar switch which is open when the pressure in line 11 falls below a higher pressure, such as 190 p.s.i.g. Switch 44 is controlled by the specific gravity of the liquid at point 47 in the suction side of the line, this switch being opened when the specific gravity is low (as for LPG) and closed when the specific gravity is high (as for gasoline and heavier hydrocarbons). Control box or circuit 46 includes delay relays and valve control switches to control the sequence of events when the pump is started. This control box also includes the devices associated with the operation of starter 27 and the sequence of starting events and will not be described further since their operation is conventional in the art.

Controller 21 may conveniently be constructed as shown in United States Patent No. 2,631,570 to H. L. Bowditch, issued March 17, 1953, and assigned on its face to the Foxboro Company. In order to secure the feature of remote adjustment of the set point of Bowditch, his movement assembly 11 is totally removed and is replaced by a pneumatic set point telemetering device such as that disclosed on pages 1 and 2 and Figure A1468 of the December, 1953 copy of section 11–506 of the "Master Instruction Manual" (hereinafter "Manual"), published by the Foxboro Company of Foxboro, Massachusetts. For convenience, it is noted that the elements in said figure denoted as "to measuring element" and "to control mechanism" correspond, respectively, to elements 16 and 14 of the Bowditch patent (most conveniently seen in Figure 2) and that the telemetered pneumatic signal is applied to the bellows shown in said figure. The set point is applied to said bellows from a remote point either manually or automatically as disclosed in said "Manual."

When a low vapor pressure product is being pumped, controller 21 is adjusted or set by remote control to maintain the pressure in line 11 at a predetermined low pressure such as 50 p.s.i. Under these conditions, switch 42 is closed, switch 43 is open and switch 44 is closed, thus maintaining a complete circuit so that operation is not interrupted. If a high vapor pressure (low specific gravity) product is to be pumped, controller 21 is remotely adjusted or set to maintain the pressure in line 11 at a higher figure, such as 200 p.s.i. when the high vapor pressure liquid is remote from line 11 at a point upstream where the pressure is sufficient to maintain complete liquid phase. When the high vapor pressure (low specific gravity) product reaches the station, switch 44 is opened but since the pressure in line 11 is being maintained above the set point of switch 43, switch 43 is closed and the circuit is complete. If a high vapor pressure product is transported to the station without adjusting controller 21 to the high pressure, switch 43 remains open and the station is shut down when switch 44 opens.

Figure 2 illustrates an embodiment of the invention utilizing a suction-discharge pressure controller in which the set-point of the controller is reversed automatically to prevent vaporization of a high vapor pressure product approaching the station and to facilitate more rapid pumping of a low vapor pressure product. In this arrangement of apparatus the controller 21A, which may suitably be an Auto-Selector controller by Foxboro (Bulletin 421), is connected to point 47 in suction line 11 and is also connected to point 48 in discharge line 13. The controller is also operatively connected with motor valve 20 in line 13 by means of conduit 49 as in Figure 1. Controller 21A is connected with an air line 51 through parallel lines 52 and 53. A pressure control valve 54 is positioned in line 52. Line 53 continuously provides air for controlling operation of the instrument. Line 52 supplies air for changing the set-point of the instrument in accordance with the suction pressure required at point 47. A valve 56 in line 52 is opened and closed by a solenoid-operated reversing means 57 as hereinafter described for changing the set-point of the instrument. Vent line 58 slowly bleeds off pressure after resetting of instrument 21A. Instrument 21 remains on one set-point for pressure maintenance at one level at point 47 when valve 56 is open and instrument air pressure is applied through line 52, and when valve 56 is closed, pressure is bled off through line 58 and the set-point of the instrument changes to the other level of pressure maintenance at point 47. Instrument 21A also controls the discharge pressure so as to maintain the same below a maximum pressure, such as 1500 p.s.i., by regulating the pumping rate or flow rate of liquid in the discharge line.

Specific gravity switch 60 is connected with line 10 at a point remote from the pump station and specific gravity switch 61 is connected with section 14 of the pipeline on the discharge side of the pumps and at the locus of the station. Orifices 62 and 63 are associated with switches 60 and 61, respectively. The specific gravity switches are in a circuit 64 connected with a power source not shown and with solenoid 57 on valve 56. Switches 60 and 61 are designed to close the circuit on an increase in specific gravity of the liquid flowing through orifices 62 and 63, respectively, and open the circuit when the specific gravity of the liquid decreases. Orifice 71 positioned in line 10 and in the bypass line from 10 to 13 function to force a small amount of liquid through the auxiliary conduits and pumps when the pumps are not in operation and a change of liquid in the main pipeline is made thereby flushing the old liquid out of the pumping system when a new liquid passes through check valve 15'. The pump arrangement in this figure is a dual one but a single pump may be utilized in the arrangement to effect substantially the same process as is practiced in the arrangement shown. Gate valves 72 are provided in lines 10 and 14 for completely blocking off the station.

In operation of the system shown in Figure 2 switches 60 and 61 are open when pumping a low specific gravity liquid and when a higher specific gravity material than has been passing through the pipeline reaches both switches 60 and 61 a circuit is completed to solenoid valve 57 thus closing valve 56 and allowing the controller to adjust its set point to a predetermined low pressure such as 50 p.s.i. When a lower specific gravity material than the liquid in the pipeline reaches switch 60 the circuit is immediately interrupted, valve 56 opens and controller 21A is adjusted or reset to a higher set point, such as 200 p.s.i. The circuit to solenoid 57 is not closed until the terminal end of the lower specific gravity slug passes switch 61. In this manner all of the low specific gravity liquid is in the high pressure discharge side of the line before the instruments change the suction pressure in line 11 to the lower operating pressure more suitable for the high specific gravity liquid. Controller 21A is also sensitive to the pressure in line 13 at point 48 and functions to regulate valve 20 when the pressure reaches a predetermined maximum such as 1500 p.s.i. A pressure switch 126 in line 13 is set to cut off the current to motors 25 and 25' when a pressure of 1550 p.s.i. is reached.

The controller 21A is constructed as shown in Figure 10922, page 2 of section 11–640 of the above-referred to "Manual," as published in September, 1953. This is a combination of two controllers, such as that of the cited Bowditch patent, which have their pneumatic systems interconnected to achieve cooperating output signals. Again, the movement assembly (set point mechanism) that is disposed between the measuring element and the output element is removed and is replaced by the telemetering device of section 11–506 of said "Manual." This done to both of the individual controllers.

The bellows of each such telemetering devices are then respectively adjusted to respond to changes in specific gravity. The response, of course, is accomplished by the change in the telemetered pressure sensed by the bellows of the telemetering device when the specific gravity switches 60 and 61 open or close solenoid 57 to thereby drop the internal bellows pressure to atmospheric. Thus, each bellows in the set point telemetering system assumes a new position and thereby a new set point for each is achieved. Different bellows spring constants and limit stops can be used to achieve various tyes of control: on-off, proportional, proportional with derivative action, and the like, as are well-known in the art. This construction is applicable to Figures 2, 3 and 4.

The arrangement of apparatus and instruments of Figure 3 is similar in most respects to that of Figure 2, the principal difference being that pressure control is obtained by controlling fluid-drive-coupling 65 between motor 25 and pump 12 rather than a valve in the pump discharge line. Controller 21 is operatively connected to an air-o-motor control 66 (Minneapolis Honeywell, model No. 6). Controller 21A is in control of air-o-motor control 66 after starting up of motor 25 and after the fluid drive 65 is up to speed. During start-up, air is bled off via line 67 and valve 68 by operation of solenoid 69 which is actuated by an adjustable time-hold relay 70 which opens valve 68 for 20 to 40 seconds. To start up the system, relay 70 is closed and power to the motor is turned on. After 20 seconds relay 70 opens and this closes valve 68 so as to supply air at instrument air pressure to air-o-motor control 66 and place controller 21A in control of the fluid drive 65. In other respects the arrangement shown in Figure 3 operates in a manner corresponding to that of the system shown in Figure 2.

The arrangement of instruments, equipments, equipment, and piping shown in Figure 4 is similar in most respects to that shown in Figures 2 and 3, differing largely in the use of a diesel engine 80 connected through a gear box 81 to a pump 125. Controller 21A connects with an air governor 83 by means of air lines 49 and 50 and is in control of the speed or torque applied by the diesel engine during normal operation of the unit. During start-up of the system an auxiliary air line 84 supplies air to instrument 83 via air line 86 by means of an air operated switch or valve 87 and an air operated switch or valve 88. A temperature controller 89 on the water jacket of engine 80 connects with switch 87 and regulates the air pressure fed to air operated switch 88.

During a start-up, as water in the water jacket of engine 80 is below about 100° F., switch 87, which is set at 4 pounds, allows 4-pound air to pass to air operated valve 88 which is positioned so that air passes through the valve from line 86 into line 50 via 4 to 3 and to governor 83. As jacket water warms up from below 100° to 140° F., the branch line pressure from temperature controller 88 increases from 0 to 15 pounds. This causes the branch line pressure of instrument 87 to increase from 4 to 15 pounds. When this branch line pressure reaches 14 pounds, valve or switch 88 trips to the 2–3 position and connects pressure controller 21A directly with air governor 83 at which time the controller 21A takes over control of the rate or speed of diesel engine 80. If jacket water temperature drops below 130° F., valve 88 trips so that the connection is again from 4 to 3 between line 86 and 50 and water must again reach 140° F. before controller 21A is again connected to the engine governor.

The arrangement of Figure 4 also shows means for starting up the station using leased telephone lines 92 which energize the coil of relay 93 closing its contacts and allowing 110 volt current to pass from lines 90 to solenoid valve 94. Valve 94 opens and allows 100–200 p.s.i.g. air from air line 95 to an air starting motor 96 on engine 80, thus cranking the engine. When the engine starts and begins to build up pressure, a pressure switch 97 sensitive to the oil pressure in the engine opens its contacts when the oil pressure builds up to a predetermined value, thus disconnecting the telephone energizing circuit by opening the circuit at 98. A Potter & Brumfield, model TR–1A, normally open, 6 volt coil, with 16 amp. contacts is suitable as relay 93. Since telephone line voltage may vary in places over as wide a range as from 6 to 50 volts, a voltage dropping resistor 99 is inserted in the line to relay 93. This resistor is 200 ohm, 10 watt, adjustable.

In order to shut down the pump station a dial telephone or other signal is utilized to establish a current over telephone lines 100 to energize time-delay-relay 101, thus closing its contacts and allowing 110 volt current to pass to solenoid valve 102 which is connected in line 103 leading to the oil pressure line of the engine. Solenoid valve 102 opens and dumps the oil pressure in the engine thereby allowing the low oil pressure, to which a shut down switch is sensitive, to stop the engine. When this occurs motor operated valve 18 opens and after a preset time, time-delay-relay 101 de-energizes and thus places the unit in condition to be started again.

After the unit shown in Figure 4 is in regular operation, suction-discharge pressure controller 21A is in control. The air governor controls the engine speed with a variable air pressure established by suction-discharge controller 21A, i.e., 4 p.s.i.g. for low idle and 15 p.s.i.g. for full load, full throttle. The governor 83 decreases engine speed when discharge pressure exceeds 1500 p.s.i., when suction pressure drops below 50 p.s.i. when pumping gasoline or distillates (high specific gravity), and when suction pressure drops below 200 p.s.i. while pumping such liquids as propane or butane (low specific gravity). The specific gravity switches operate to reset suction-discharge controller 21A in the manner described in connection with the system of Figures 2 and 3.

Certain modifications of the invention will become apparent to those skilled in the art and the illustrative details disclosed are not to be construed as imposing unnecessary limitations on the invention.

I claim:

1. A method for controlling the suction pressure of a liquid being pumped in a pipeline directly upstream of a pump therein which comprises sensing the occurrence of a change in specific gravity and reducing the rate of flow of liquid in the line and through said pump so as to increase said suction pressure when the specific gravity of the liquid being pumped decreases and increasing the rate of flow of liquid in the line so as to decrease said suction pressure when the specific gravity of the liquid being pumped increases.

2. A method for controlling the suction pressure of the liquid being pumped in a pipeline directly upstream of a pump therein, alternately carrying normally liquid hydrocarbons and normally gaseous hydrocarbons which comprises sensing a change in the liquid being pumped from a relatively high specific gravity liquid which is normally liquid at atmospheric pressure to a relatively low specific gravity liquid which is normally gaseous at atmospheric pressure and reducing the rate of flow of liquid in the line and through said pump so as to increase said suction pressure when the liquid being pumped changes from a relatively high specific gravity liquid which is normally a liquid at atmospheric pressure to a relatively low specific gravity liquid which is normally gaseous at atmospheric pressure, thereby avoiding vaporization of said normally gaseous liquid hydrocarbon, and increasing the rate of flow of liquid in the line so as to decrease said suction pressure when the liquid being pumped changes from normally gaseous to normally liquid, thereby increasing the pumping efficiency.

3. A process for pumping liquids of different specific gravities in sequence in a pipeline which comprises sensing the specific gravity of the liquid in said line at a point downstream of a pump in said line and when a substantially lower specific gravity fluid enters the line at the point of sensing, decreasing the rate of flow through said pump and thereafter regulating the flow rate of liquid in said line so as to maintain a predetermined suction pressure in said line above a predetermined minimum which assures complete liquid phase.

4. A process for pumping liquids of high and low specific gravities in sequence in a pipeline which comprises sensing the specific gravity of the liquid approaching an operating pump in said line at a point where the pressure is sufficient to maintain the low specific gravity in liquid phase; when said liquid is of higher specific gravity than the liquid in said pump, allowing all of said lower specific gravity liquid and a portion of said higher specific gravity liquid to pass through said pump and thereafter reducing the suction pressure in said line to a predetermined minimum which maintains liquid phase by increasing the rate of flow of liquid in the line; and when said liquid is of lower specific gravity than the liquid in said pump, immediately increasing the suction pressure in said line to a higher predetermined minimum which maintains liquid phase by decreasing the rate of flow of liquid in said line.

5. The process of claim 4 wherein the rate of flow in said line is regulated by varying the rate of operation of said pump.

6. The process of claim 4 wherein the rate of flow in said line is regulated by varying a flow control valve in said line on the discharge side of said pump.

7. The process of claim 4 wherein said high specific gravity liquid comprises normally liquid hydrocarbon and said low specific gravity liquid comprises normally gaseous hydrocarbon.

8. Pipeline pumping apparatus comprising in combination a pipeline; a pump station in said pipeline including a pump and a power source for operating said pump; a throttle valve in said line on the discharge side of said pump; and a pressure controller having a high pressure set point and a low pressure set point operatively connected with said throttle valve to control the pressure at the pump suction alternately at said high pressure set point and said low pressure set point and connected to said line on the suction side of said pump so as to be sensitive to pressure therein so as to control the pressure alternately at said high pressure set point and said low pressure set point.

9. The apparatus of claim 8 including an electric circuit operatively connected with said power source so that opening of said circuit shuts off said power source; first and second switches in said circuit connected in parallel, said first switch being a pressure sensitive switch adapted to open at pressures below a predetermined relatively high pressure and being operatively connected with said line on the suction side of said pump, said second switch being sensitive to the specific gravity of a liquid in said line and being connected with said line on the suction side of said pump and adapted to open when the specific gravity is low and close when same is high; a third switch in said circuit in series with said first and second switches, being sensitive to pressure in said line on the suction side of said pump and adapted to open at pressures below a predetermined relatively low pressure; and means for energizing said circuit.

10. The apparatus of claim 9 including a pressure switch in said circuit operatively connected with said line on the discharge side of said pump and adapted to open when the pressure therein reaches a predetermined maximum safety pressure for the line.

11. The apparatus of claim 9 wherein said power source is an electric motor having a power circuit and said circuit is operatively connected with said power circuit.

12. Pipeline pumping apparatus comprising in combination a pipeline; a pump station in said pipeline including a pump and a prime mover for operating said pump; a first specific gravity switch in said line on the discharge side of said pump, said first switch being adapted to close a circuit on an increase in specific gravity in said line at the switch position; a second similar specific gravity switch in said line on the suction side of said pump remote therefrom; means for regulating the rate of flow through said pump; a suction-discharge pressure controller having high and low set points connected by separate lines to said line on the suction and discharge sides of said pump and operatively connected to said means; an electric circuit connecting said switches with setting means for said controller.

13. The apparatus of claim 12 wherein said means for regulating the rate of flow through said pump comprises a motor valve in the line on the discharge side of said pump.

14. The apparatus of claim 12 wherein said prime mover is connected by a fluid drive to said pump and said means includes a fluid drive torque regulator.

15. The apparatus of claim 12 wherein said means for regulating the rate of flow through said pump comprises a speed control on said prime mover.

16. The apparatus of claim 15 wherein said prime mover comprises an internal combustion engine and said means comprises a governor on said engine.

17. Pipeline pumping apparatus comprising in combination a pipeline; a pump station in said pipeline including a pump and a prime mover for operating said pump; means for regulating the rate of flow of liquid through said pump; a pressure controller connected to said line on the suction side of said pump and sensitive to pressures therein and operatively connected with said means, said controller having two set points of different pressures; reversing means connected with said controller for changing from one set point to the other; and operating means for said reversing means adapted to change said controller to the higher of said set points when a lower specific gravity liquid has displaced a higher specific gravity liquid in said line to a locus therein on the discharge side of said pump and to change said controller to the lower of said set points when a higher specific gravity liquid has displaced a lower specific gravity liquid in said line to a locus on the suction side of said pump.

18. The apparatus of claim 17 wherein said pressure controller is compressed-air operated and said reversing means comprises a solenoid operated valve in an air supply line to said controller; and including a pair of specific gravity switches in series in a circuit with a power source operatively connected with said solenoid, said switches being connected with said line, one on the discharge side of said pump and the other on the suction side thereof at a remote point therefrom where the pressure is above the vapor pressure of liquid therein, said switches being adapted to close said circuit on an increase in specific gravity of the fluid in the line at the locus of the switch and to open said circuit on a decrease in specific gravity of the liquid in the line at the locus of the switch.

19. The apparatus of claim 18 wherein said means for regulating the flow of liquid through said pump comprises a motor valve in the discharge side of said line.

References Cited in the file of this patent

UNITED STATES PATENTS

| | | |
|---|---|---|
| 1,279,613 | Traudt | Sept. 24, 1918 |
| 1,341,696 | Wilkin | June 1, 1920 |
| 1,390,829 | Smoot | Sept. 13, 1921 |
| 2,049,233 | Thomas | July 28, 1936 |
| 2,309,415 | Pearson et al. | Jan. 26, 1943 |
| 2,330,755 | Smith | Sept. 28, 1943 |
| 2,339,957 | Smith | Jan. 25, 1944 |
| 2,401,910 | Condit et al. | June 11, 1946 |
| 2,651,995 | Blackburn | Sept. 15, 1953 |